UNITED STATES PATENT OFFICE.

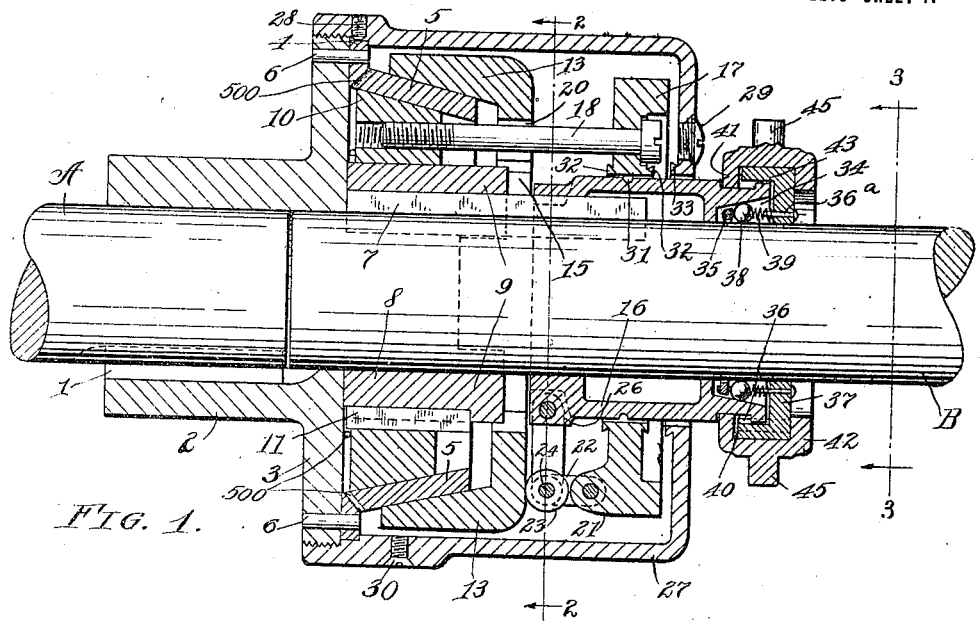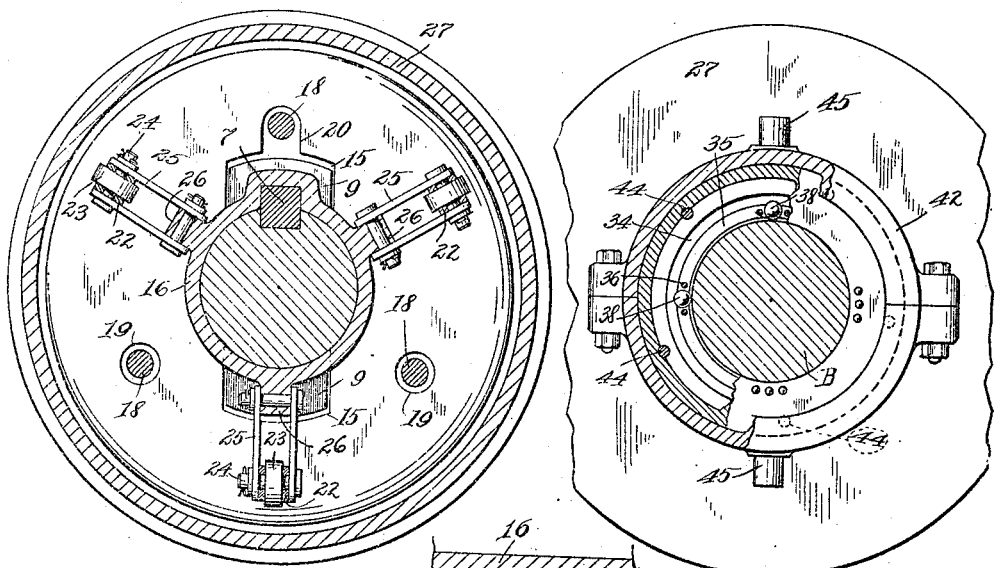

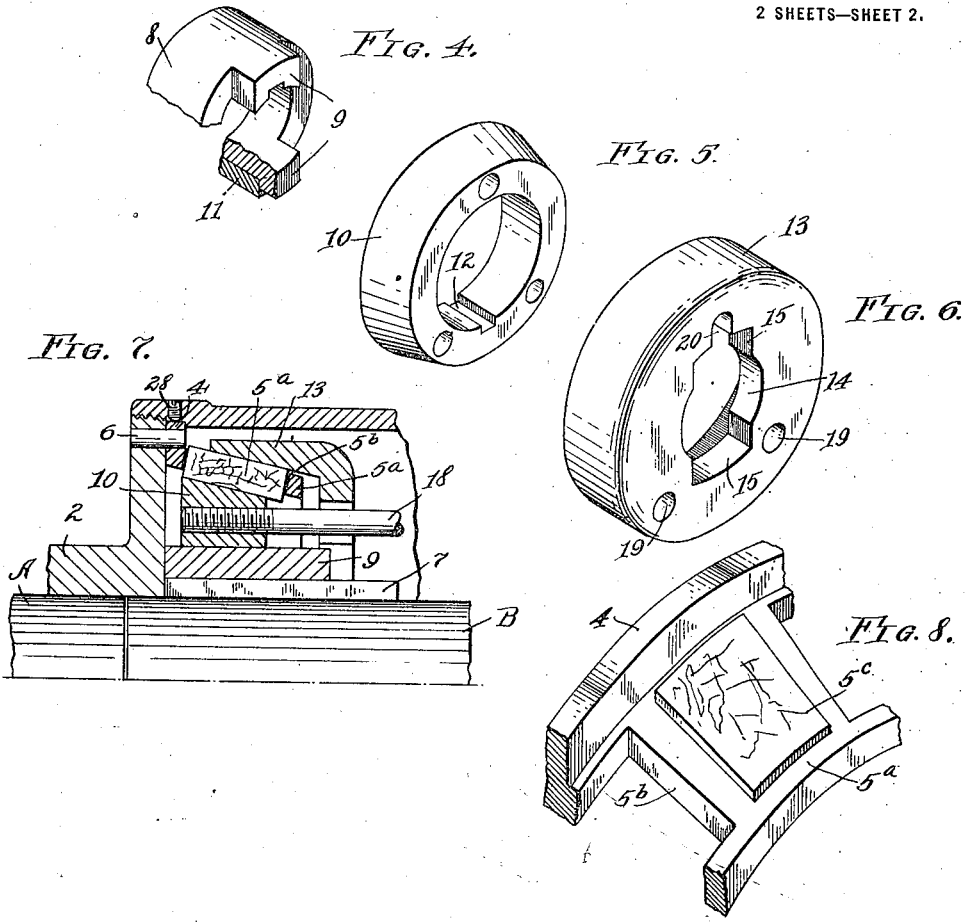

CLYDE B. MITCHELLA, OF AKRON, OHIO, ASSIGNOR OF ONE-HALF TO WILLIAM A. HEANEY, OF AKRON, OHIO.

CLUTCH.

1,141,648.  Specification of Letters Patent.  Patented June 1, 1915.

Application filed December 18, 1913.  Serial No. 807,372.

*To all whom it may concern:*

Be it known that I, CLYDE B. MITCHELLA, a citizen of the United States, residing at Akron, in the county of Summit and State of Ohio, have invented a certain new and useful Improvement in Clutches, of which the following is a full, clear, and exact description, reference being had to the accompanying drawings.

This invention relates to an improved clutch for general use, although certain of its features make it especially adaptable to looms, thread spinning machines, and other machines wherein the article operated upon is liable to breakage from a sudden jerk caused by the quick and positive engagement of clutch members, and wherein it is desirable to vary the pressure between the clutch members so that the same will slip under the load of a predetermined resistance and thereby prevent damage to either the machine or the article it is operating upon.

The objects of the invention are to provide a clutch of the above character which is comparatively simple of construction and economical of production, which is extremely efficient; which is quiet of operation; which is designed with the view of safety to the operator; wherein access to the different parts may be easily and quickly gained for the purpose of inspection and repair; wherein the parts are very effectively lubricated; wherein the driven member is gradually picked up when the clutch is thrown into operation, but promptly released when the operation is reversed; and wherein the clutch elements may be held in engagement at varying degrees of pressure.

The above and further objects, which will become apparent as this description proceeds, are attained by a clutch constructed in accordance with the accompanying drawings, wherein—

Figure 1 represents a central vertical section through the clutch; Fig. 2 is a section on the line 2—2 of Fig. 1; Fig. 3 is a section on the correspondingly numbered line of Fig. 1, a portion of the shifting collar being broken away to more clearly illustrate certain structural details; Fig. 4 is a perspective of the collar through which the sliding clutch members are held against rotation upon the shaft; Figs. 5 and 6 are perspective views, respectively, of the inner and outer sliding clutch members; Figs. 7 and 8 show a modified form of the intermediate clutch member wherein friction blocks are employed; Fig. 9 is a sectional detail through a portion of the ball clutch mechanism for holding the clutch members in engagement at varying degrees of pressure.

In the drawings, A represents a shaft which is adapted to drive, through my improved clutch, the shaft B. For the purpose of description we will assume that the shaft A is the driving shaft and that the shaft B is driven therefrom. It will be understood, however, that it is immaterial which of the shafts is considered the driving shaft as the clutch will operate equally as well in both directions.

Connected by the key 1 to the end of the shaft A is the hub 2 of a head 3 which has secured to its opposite face, near its edge, the lateral flange 4 of the intermediate frusto-conical clutch member 5, by means of the pins 6.

It will be noted that the end of the shaft A is inset from the face of the head 3 to provide a bearing for the end of the shaft B.

7 represents a key which locks to the shaft B, adjacent the head 3, a collar 8 (shown in perspective in Fig. 4) which is provided with a pair of diametrically opposed lugs 9 which extend from that side of the collar opposite the head 3.

Adapted to slide upon the collar 8 is the inner clutch member 10 (Fig. 5), the same being splined to the collar by the key 11 which occupies a key way 12 in said member. It will be observed that the outer surface of the clutch member 10 is tapered to correspond to the adjacent surface of the intermediate clutch member 5. Adapted to coöperate with the outer surface of the intermediate clutch member is the correspondingly tapered face of the outer clutch member 13 which is dish-shaped and has a central aperture 14 whereby said clutch member is guided upon the shaft B. Extending laterally from the aperture 14 are notches 15 for the reception of the lugs 9 of the collar 8. In this manner the inner and outer clutch members are caused to rotate together and with the shaft section B.

Slidably mounted upon the shaft B beyond the outer clutch member, and splined thereto by the key 7, is a sleeve 16. An annulus 17 is slidably mounted upon the exterior of the sleeve 16 and has connection with the inner clutch member 10 through the screws 18, three of such screws being shown in the drawings. The outer clutch member is provided with holes 19 and a notch 20 (which extends from one of the former notches 15) through which the screws 18 pass. Pivoted to the ears 21 which extend from the outer portion of the annulus 17 toward the clutch member 13, are links 22, between the forward ends of which are anti-friction rollers 23 for engagement with the adjacent portions of the clutch member 13. The rollers 23 are journaled upon pins 24 which pass through the ends of the links 22 and through the ends of similar links 25 which have their opposite ends pivoted to lugs 26 which radiate from the end of the sleeve 16.

A casing 27 incloses the operating parts so far described, and is threaded upon the periphery of the head 3, a screw 28 tending to lock the threaded parts together and prevent the casing from unscrewing. An opening in the circular wall of the casing which is normally closed by a screw plug 29, furnishes a means of access to the screws 18 for the purpose of adjustment between the inner clutch member 10 and the annulus 17. The reason for this adjustment will become apparent from a later description of the operation of the device. A screw 30, which is threaded through the cylindrical wall of the casing, is used to plug the opening through which oil may be introduced into the casing or drained therefrom.

A circumferential groove 31 extends around the sleeve 16 and is located at a point that is always within the casing regardless of the movements of the sleeve. This groove tends to arrest the flow of oil along the sleeve from the interior to the exterior of the casing, when the clutch is at rest. An annular flange 32 extends about each face of the annulus adjacent its inner edge, and a similar flange 33 is formed upon the interior of the casing and surrounds the opening through which the sleeve 16 passes.

From the description thus far it will be seen that, when the sleeve 16 is reciprocated upon the shaft B, the links 25 will cause the rollers 23 to traverse the face of the outer clutch member 13 and swing the links 22 upon their pivots. In the drawings, the sleeve 16 is shown in its extreme inner position with the links 25 at substantially right angles with respect to the axis of the sleeve and the links 22 perpendicular to the former links. With the parts in this position, the outer clutch member 13 and the annulus 17 are separated to the maximum extent, and by reason of the connection through the screws 18 of the annulus with the inner clutch member 10, it will be seen that simultaneously with the engagement of the outer clutch member with the intermediate clutch member, the inner clutch member is drawn against the inner face of the intermediate member. It is obvious that, by properly adjusting the inner clutch member 10 with respect to the annulus 17 through the screws 18, the outer clutch member will be caused to become effective when the links 25 are at substantially right angles to the sleeve 16, or, in other words, when they are on dead center, and when the links 22 are perpendicular to the circular face of the clutch member 13. This arrangement of the parts assures a very powerful and positive gripping of the intermediate clutch member by the outer clutch members, and this relation of the parts may be very easily maintained by an occasional adjustment of the screws 18 to compensate for any wear that may occur in the clutch members. Furthermore, with this construction, a much shorter stroke of the operating lever is required than in the prevailing type of clutches with which I am familiar.

The parts of the clutch may be very effectively lubricated by placing within the casing a quantity of oil having a level below the opening through which the sleeve 16 passes. When the parts are revolving it is obvious that the oil will be distributed to every part of the clutch, and moreover when the clutch is free a film of oil will accumulate between the clutch faces of the members 5, 10 and 13 and prevent any rattling of the parts. A series of holes 500, located about the base of the frusto-conical clutch member 5, permit oil to pass freely from the outer portion of the clutch to within the clutch member 5 and amply lubricate the adjacent surfaces of the head 3 and the collar 8, as well as the bearing end of the shaft B. The presence of this oil coating also insures a very gradual "pick up" of the clutch which, as mentioned hereinbefore, is very desirable in certain classes of work; it being necessary, first, to displace the oil between the clutch members before their faces adhere. The flanges 32 of the annulus 17 and the flange 33 of the casing provide means for conducting the oil which accumulates on these parts during the rotation of the clutch to the lower portion of the casing, thereby preventing the oil from dripping upon the sleeve 16 from where it might, through capillary attraction, be drawn to the end of the sleeve beyond the casing to be thrown off by centrifugal force when the clutch is again rotated. It will be noticed that the outer walls of the flanges 32 and 33 are inclined for the purpose of forming troughs or gutters through which the oil is effectively conducted.

The means for securing varying degrees of pressure between the clutch members, which has been previously referred to, will now be described. The outer circular face of the sleeve 16 is provided with a conical cavity 34 within the reduced end of which is supported a ring 35 which has connection, through pairs of pins 36, with a ring 37 that is slidably mounted upon the shaft B adjacent the end of the sleeve 16. Guided between the pins 36 of each pair is a ball 38 which is constantly forced toward the reduced end of the cavity 34 and toward the ring 35 by a spring 39 which is guided upon an intermediate pin 36ᵃ (see Fig. 9). The sleeve 16 is provided, adjacent its outer end, with a circumferential channel 40 which is adapted to receive the edge of one of the side flanges 41 of a channel member which, as shown particularly in Fig. 3, constitutes a split, shifting collar 42. It will be seen from Fig. 1 that the thickness of the flange 41 is somewhat less than the width of the channel 40, but that the cross dimension of the channel within the collar 42 is substantially the same as the width of the annular peripheral flange 43 of the ring 37. It will also be noticed from said Fig. 1 and from Fig. 3, that the ring 37 is locked to the end of the sleeve 6 by pins 44, whereby the ring is permitted to move toward and away from the end of the sleeve 16 but is caused to rotate therewith. The clutch may be operated by a shifting fork of any appropriate type (not shown) which has connection with the trunnions 45 of the shifting collar 42.

From the foregoing it will be seen that a ball clutch is provided for locking the sleeve 16 against longitudinal movement upon the shaft B, which clutch operates in the following manner: With the parts in the position shown in Fig. 1, it will be understood that the balls 38 are forced, by the springs 39, toward the reduced end of the cavity 34 and any tendency of the sleeve 16 to move to its outer position will be resisted by the clamping of the balls 38 between the tapered wall of the cavity 34 and the surface of the shaft B. It will be seen, also, that this condition would exist when the sleeve 16 is in any position along the shaft, assuring, in this manner, a positive locking of the clutch parts in any adjusted position. To disengage the clutch, it is only necessary to shift the collar 42 and consequently the collar 38 outwardly, when the ring 35 will engage the balls 38 to dislodge them against the tension of the springs 39, the excessive width of the channel 40 over the channel 41 permitting this movement. Thereafter, the sleeve 16 may be positively slid upon the shaft by the engagement of the flange 41 with the opposite side of the channel 40.

In Figs. 7 and 8 I have shown a modified form of an intermediate clutch member 5ᵃ which shows such member as provided with openings 5ᵇ for the reception of friction blocks 5ᶜ which may be of fiber, wood or similar material. The substitution of this form of intermediate clutch member for the form previously described obviates the necessity for the presence of a lubricant within the casing; and, in fact, the casing may be dispensed with entirely except for the safety it assures by inclosing the operating parts of the clutch. In this connection, attention will be called to the fact that there are no protruding parts upon the casing in any of the forms of my clutch shown herein, that are liable to injure the operator should he come in contact with the clutch while the same is in operation.

Having thus described my invention, what I claim is:—

1. The combination with a driving and a driven element, of a frusto-conical shell carried by one element, a pair of clutch members movably carried by the other element and each having a tapered face that is arranged to engage one of the tapered faces of the shell, a member reciprocable with respect to the last mentioned element, connections between the reciprocating member and the clutch members for moving said clutch members in opposite directions and into engagement with said shell, and means coöperating with the last mentioned element and the reciprocating member for locking the reciprocating member against movement when the clutch members are in engagement with the aforesaid shell.

2. The combination with a driving and a driven element, one of said elements comprising a shaft, a pair of clutch members which are carried by and are slidable with respect to the shaft, an intermediate clutch member which is carried by the other element and adapted to be engaged on its opposite sides by the former members, a sleeve slidable upon the shaft adjacent one of the slidable clutch members, a body movable toward and away from this last mentioned clutch member, means connecting the other slidable clutch member with the body, means for separating the body and the adjacent clutch member, and further means for locking said parts in separated position.

3. The combination with a driving and a driven element, one of said elements comprising a shaft, a pair of clutch members carried by and slidable with respect to the shaft, an intermediate clutch member which is carried by the other element and adapted to be engaged on its opposite sides by the former members, a sleeve slidable upon the shaft adjacent one of the slidable clutch members, a body movable toward and away from the last mentioned clutch member, means connecting the other slidable clutch member with the body, means for separating the body and the adjacent clutch member, said means comprising links which are pivoted to the body, friction rollers carried by the free ends of the links for engagement with the adjacent clutch member, and further links which connect said free ends of the former links with the end of the sleeve.

4. The combination with a driving and a driven element, one of said elements consisting of a shaft, of a clutch which comprises a head, a frusto-conical shell which is carried thereby, an inner clutch member which is carried by and is slidable with respect to the shaft and which has a tapered face for engagement with the inner face of the shell, an outer clutch member slidable upon the shaft and having a portion overhanging the shell which is tapered for coöperation with its outer face, a sleeve slidably mounted upon the shaft adjacent the last mentioned clutch member, an annulus slidable upon said sleeve, means connecting the annulus with the inner clutch member, and means actuated upon the movement of the sleeve for separating the annulus and the outer clutch member.

5. The combination with a driving and a driven element, one of said elements consisting of a shaft, of a clutch which comprises a head, a frusto-conical shell which is carried thereby, an inner clutch member which is carried by and is slidable with respect to the shaft and which has a tapered face for engagement with the inner face of said shell, an outer clutch member slidable upon the shaft and having a portion overhanging the shell which is tapered for coöperation with its outer face, a sleeve slidably mounted upon the shaft adjacent the last mentioned clutch member, an annulus slidable upon said sleeve and having a series of ears, connections between the annulus and the inner clutch member, links pivoted to the ears of the annulus, anti-friction devices carried by the free ends of the links and adapted to traverse the adjacent surface of the outer clutch member, and links connecting the free ends of the former links to the end of the sleeve.

6. The combination with a driving and a driven element, one of said elements consisting of a shaft, of a clutch which comprises a head, a frusto-conical shell which is carried thereby, an inner clutch member which is carried by and is slidable with respect to the shaft and which has a tapered face for engagement with the inner face of said shell, an outer clutch member slidable upon the shaft and having a portion overhanging the shell which is tapered for coöperation with its outer face, a sleeve slidably mounted upon the shaft adjacent the last mentioned clutch member, an annulus slidable upon said sleeve and having a series of ears, connections between the annulus and the inner clutch member, a pair of links pivoted to each of the ears of the annulus, rollers journalled between the free ends of the links and adapted to traverse the adjacent surface of the outer clutch member, and links connecting the free ends of the former links to the end of the sleeve.

7. The combination with a driving and a driven element, one of said elements consisting of a shaft, of a clutch which comprises a head, a frusto-conical shell which is carried thereby, an inner clutch member which is carried by and is slidable with respect to the shaft and which has a tapered face for engagement with the inner face of said shell, an outer clutch member slidable upon the shaft and having a portion overhanging the shell which is tapered for coöperation with its outer face, a sleeve slidably mounted upon the shaft adjacent the last mentioned clutch member, an annulus slidable upon said sleeve and having a series of ears, connections between the annulus and the inner clutch member, a pair of links pivoted to each of the ears of the annulus, rollers journaled between the free ends of the links and adapted to traverse the adjacent surface of the outer clutch member, links connecting the last mentioned ends of the former links to the end of the sleeve, a device for shifting the sleeve, and means for locking the sleeve in any adjusted position along the shaft.

8. The combination with a driving and a driven element, of a pair of clutch members slidably carried by one of said elements, an intermediate clutch member which is carried by the other element and adapted to be engaged on its opposite sides by the former members, a sleeve slidable upon the element which carries the pair of clutch members, connections between the sleeve and the slidable clutch members whereby the movement of the sleeve in one direction will cause the slidable clutch members to approach the intermediate clutch member, and means incorporated within the sleeve and coöperating with the element whereon the sleeve is slidable, for locking the sleeve against movement in the opposite direction.

9. The combination with a driving and a driven element, of a pair of clutch members slidably carried by one of said elements, an intermediate clutch member which is carried by the other element and adapted to be engaged on its opposite sides by the former members, a sleeve slidable upon the element which carries the pair of clutch members, connections between the sleeve and the slidable clutch members whereby the movement of the sleeve in one direction will cause the slidable clutch members to approach the intermediate clutch member, means incorporated within the sleeve and coöperating with the element whereon the sleeve is slidable, for locking the sleeve against movement in the opposite direction, and mechanism for rendering ineffective said locking means and for moving the sleeve.

10. The combination with a driving and a driven element, one of said elements consisting of a shaft, of a pair of clutch members carried by and slidable with respect to the shaft, an intermediate clutch member which is carried by the other element and adapted to be engaged on its opposite sides by the former members, a sleeve slidable upon the shaft and having a recess which has a tapered wall that is opposed to a portion of the shaft, connections between the sleeve and the slidable clutch members whereby the movement of the sleeve in one direction will cause the slidable clutch members to approach the intermediate clutch member, and means for locking the sleeve against movement in the opposite direction, said means consisting of a locking member within the recess of the sleeve, means tending to force said member toward the reduced end of the recess, and a device for dislodging said member.

11. The combination with a driving and a driven element, one of said elements consisting of a shaft, of a pair of clutch members carried by and slidable with respect to the shaft, an intermediate clutch member which is carried by the other element and adapted to be engaged on its opposite sides by the former members, a sleeve slidable upon the shaft adjacent one of the slidable clutch members and having a cavity the wall whereof is tapered with respect to the opposed surface of the shaft, a member within the reduced end of said cavity, a rotary member in said cavity, means tending to move the rotary member toward the former member, a shifting device carried by the sleeve, and connections whereby the movement of the shifting device in one direction will cause the first mentioned member to move the rotary member against the action of said means.

In testimony whereof, I hereunto affix my signature in the presence of two witnesses.

CLYDE B. MITCHELLA.

Witnesses:
BRENNAN B. WEST,
HUGH B. McGILL.